United States Patent
Kasuga

(10) Patent No.: US 11,820,054 B2
(45) Date of Patent: Nov. 21, 2023

(54) METHOD FOR MANUFACTURING FIRED BODY OF FLUORORESIN, FIRED BODY OF FLUORORESIN, METHOD FOR MANUFACTURING FLUORORESIN DISPERSION, METHOD FOR MANUFACTURING FIRED BODY, FLUORORESIN DISPERSION, AND FIRED BODY

(71) Applicant: BLANC BIJOU CO., LTD., Tokyo (JP)

(72) Inventor: Hideyuki Kasuga, Tokyo (JP)

(73) Assignee: BLANC BIJOU CO., LTD., Tokyo (JP)

( * ) Notice: Subject to any disclaimer, the term of this patent is extended or adjusted under 35 U.S.C. 154(b) by 425 days.

(21) Appl. No.: 17/253,330

(22) PCT Filed: Mar. 29, 2019

(86) PCT No.: PCT/JP2019/014041
§ 371 (c)(1),
(2) Date: Dec. 17, 2020

(87) PCT Pub. No.: WO2019/244433
PCT Pub. Date: Dec. 26, 2019

(65) Prior Publication Data
US 2021/0362378 A1    Nov. 25, 2021

(30) Foreign Application Priority Data
Jun. 21, 2018 (JP) ................. 2018-118174

(51) Int. Cl.
*B29C 43/00* (2006.01)
*C08F 14/26* (2006.01)
(Continued)

(52) U.S. Cl.
CPC .............. *B29C 43/006* (2013.01); *B29B 9/02* (2013.01); *B29C 43/003* (2013.01); *C08F 2/22* (2013.01);
(Continued)

(58) Field of Classification Search
CPC ................ B29C 43/003; B29C 43/006; B29B 2017/042; Y02W 30/62; B29K 2027/12–18
See application file for complete search history.

(56) References Cited

FOREIGN PATENT DOCUMENTS

| JP | 55-105865 A | 8/1980 |
| JP | H05320360 | * 12/1993 |

(Continued)

OTHER PUBLICATIONS

Translation of JP2006070233 (Year: 2023).*
(Continued)

*Primary Examiner* — Mary Lynn F Theisen
(74) *Attorney, Agent, or Firm* — Sughrue Mion, PLLC; Richard C. Turner

(57) ABSTRACT

A method for manufacturing a fired body of a fluororesin includes a mixing step of mixing a fluororesin pulverized after firing and an unfired fluororesin powder aggregated after emulsion polymerization at a rate based on predetermined strength to produce a component to be fired, and a firing step of firing the component to be fired produced.

18 Claims, 19 Drawing Sheets

(51) Int. Cl.
| | |
|---|---|
| *B29K 27/18* | (2006.01) |
| *C08L 27/12* | (2006.01) |
| *C08L 27/18* | (2006.01) |
| *B29B 9/02* | (2006.01) |
| *C08F 2/22* | (2006.01) |
| *C08F 6/14* | (2006.01) |
| *B29K 105/00* | (2006.01) |

(52) U.S. Cl.
CPC ................ *C08F 6/14* (2013.01); *C08F 14/26* (2013.01); *C08L 27/12* (2013.01); *C08L 27/18* (2013.01); *B29K 2027/18* (2013.01); *B29K 2105/251* (2013.01)

(56) References Cited

FOREIGN PATENT DOCUMENTS

| | | | |
|---|---|---|---|
| JP | 07-308973 A | | 11/1995 |
| JP | 2000-508015 A | | 6/2000 |
| JP | 2004-291462 A | | 10/2004 |
| JP | 2006070233 | * | 3/2006 |
| JP | 2015-108126 A | | 6/2015 |
| WO | 97/36954 A1 | | 10/1997 |

OTHER PUBLICATIONS

Translation of JPH05320360 (Year: 2023).*
Office Action dated Sep. 29, 2022 from the China National Intellectual Property Administration in CN Application No. 201980040861.3.
International Search Report of PCT/JP2019/014041 dated Jun. 25, 2019.

* cited by examiner

Fig.4

|  | unfired PTFE powder | PTFE powder after firing |
|---|---|---|
| crystallinity | high (over 90%) | An amorphous part is formed |
| crystalline state | extended chain | folded state |
| melting point in primary heating | 342°C | 327°C |
| solidification temperature | 315°C | 311°C |
| melting point in secondary heating | 326°C | 328°C |
| impurities | almost no | almost no |
| color tone | white | white |

Fig.15

|  | tensile strength (MPa) | tensile elongation (%) |
|---|---|---|
| Only unfired PTFE powder | 32 | 340 |
| Only first powder to fibrillate | 23 | 440 |
| Only PTFE powder after firing | 5 | 50 |
| PTFE powder after firing(Porosity 0%) | 15 | 196 |
| second powder+first powder to fibrillate20wt% | 10 | 100 |
| second powder+first powder to fibrillate50wt% | 21 | 400 |
| second powder+first powder to fibrillate80wt% | 23 | 460 |
| second powder+PTFE molding powder50wt% | 16 | 230 |

METHOD FOR MANUFACTURING FIRED BODY OF FLUORORESIN, FIRED BODY OF FLUORORESIN, METHOD FOR MANUFACTURING FLUORORESIN DISPERSION, METHOD FOR MANUFACTURING FIRED BODY, FLUORORESIN DISPERSION, AND FIRED BODY

CROSS REFERENCE TO RELATED APPLICATIONS

This application is a National Stage of International Application No. PCT/JP2019/014041 filed on Mar. 29, 2019, claiming priority based on Japanese Patent Application No. 2018-118174 filed on Jun. 21, 2018.

FIELD

The present invention relates to a method for manufacturing a fired body of a fluororesin, a fired body of a fluororesin, a method for manufacturing a fluororesin dispersion, a method for manufacturing a fired body, a fluororesin dispersion, and a fired body.

BACKGROUND

Synthesis resins include fluororesins containing fluorine and having features such as high heat-resistance and a low coefficient of friction. In addition, fluororesins include fully fluorinated resins, partially fluorinated resins, and fluorinated resin copolymers. For example, polytetrafluoroethylene (PTFE) is an extremely excellent fluororesin (polymer material) which has various excellent properties such as heat resistance, chemical resistance, weather resistance and sliding properties in combination.

However, while PTFE is a member of thermoplastic polymers, PTFE retains a high viscosity ($10^{10}$ to $10^{12}$ Pa·S) even at a temperature equal to or higher than its melting point and exhibits no flowability. Therefore, PTFE products are manufactured by compressing and molding powder, followed by firing to produce a fired body, and subjecting the fired body to machining to provide a predetermined shape, as in powder metallurgy processes for metal, for example, unlike common manufacturing processes of polymers.

The machining process of PTFE generates a large quantity of chips. Since PTFE is extremely chemically stable, PTFE does not receive even microbial degradation in soil. In addition, PTFE is not incinerated, because a temperature of 600° C. or higher is required to fully vaporize PTFE, and harmful gas (hydrogen fluoride and the like) is generated during heating. Therefore, the only way to dispose of such a large quantity of chips is to use the chips as industrial waste for landfill under the current circumstances, and an effective disposal method and an effective recycling method are required.

PTFE is a highly rare polymer made mainly of a mineral called fluorite. Fluorite is found mainly in China, the United Kingdom, South Africa, and Mexico, but recycling technology of PTFE has long been required, concerning the depletion thereof. Fluorite production in Japan is low, and Japan is also the largest importing country of fluorite in the world.

In addition, it has been confirmed that recycled PTFE fired bodies manufactured by using once-fired PTFE products and chips as raw materials tend to have mechanical strength greatly inferior to that of fired bodies obtained by molding PTFE powder just produced from fluorite and firing it. Meanwhile, there is an example in which fluororubber is used for a wearable application recently.

Then, a method in which 30% by weight or less of a recycling raw material powder including fluororesin pulverized matter that has been heated and 70% by weight or more of an unheated fluororesin powder are mixed to provide a mixture system fluororesin raw material, and using this mixture system fluororesin raw material, a mixture system fluororesin molded product is obtained by a molding method with a molding condition under which a preliminary molding pressure is higher than that in usual molding conditions or by a molding method with a molding condition under which the mixture system fluororesin raw material is pressurized and cooled, with its molten state kept has been proposed as conventional art relating to recycling of fluororesins (see PTL 1, for example).

CITATION LIST

Patent Literature

[PTL 1] JP 2015-108126 A

SUMMARY

Technical Problem

However, there has been the following problem in the past: 70% by weight or more of an unheated fluororesin powder is required to be mixed in, and a molding method with a molding condition under Which a preliminary molding pressure is higher than that in usual molding conditions or a molding method with a molding condition under which the mixture system fluororesin raw material is pressurized and cooled, with its molten state kept is required to be used, and fluororesins cannot be efficiently recycled.

The present invention has been made in view of the above and aims at providing a method for manufacturing a fired body of a fluororesin efficiently using a fluororesin pulverized after firing, a fired body of a fluororesin, a method for manufacturing a fluororesin dispersion, a method for manufacturing a fired body, a fluororesin dispersion, and a fired body.

Means for Solving the Problems

In order to solve the problems described above and achieve the object, a method for manufacturing a fired body of a fluororesin according to one embodiment of the invention, comprising: a mixing step of mixing a fluororesin pulverized after firing and an unfired fluororesin powder aggregated after emulsion polymerization at a rate based on predetermined strength to produce a component to be fired; and a firing step of firing the component to be fired produced.

And the method for manufacturing a fired body of a fluororesin according to one embodiment of the invention, wherein the fluororesin pulverized after firing and the unfired fluororesin powder are both polytetrafluoroethylene.

And the method for manufacturing a fired body of a fluororesin according to one embodiment of the invention, wherein the fluororesin pulverized after firing is about 50 wt % in the rate.

And the method for manufacturing a fired body of a fluororesin according to one embodiment of the invention, wherein the mixing step further includes: a dissimilar property component mixing step of mixing a dissimilar property component having a property different from those of both the fluororesin pulverized after firing and the unfired fluororesin powder.

And a fired body of a fluororesin according to one embodiment of the invention, comprising: a fluororesin pulverized after firing; and an unfired fluororesin powder aggregated after emulsion polymerization, wherein the fluororesin pulverized after firing and the unfired fluororesin powder have been fired after being mixed.

And the fired body of a fluororesin according to one embodiment of the invention, wherein the fluororesin pulverized after firing and the unfired fluororesin powder are both polytetrafluoroethylene.

And the fired body of a fluororesin according to one embodiment of the invention, wherein the fluororesin pulverized after firing accounts for about 50 wt % of the total fired body.

And the fired body of a fluororesin according to one embodiment of the invention, further comprising a dissimilar property component mixed therein, the dissimilar property component having a property different from those of both the fluororesin pulverized after firing and the unfired fluororesin powder.

And a method for manufacturing a fluororesin dispersion according to one embodiment of the invention, comprising: a mixing step of mixing a fluororesin pulverized after firing and an unfired fluororesin powder aggregated after emulsion polymerization at a rate based on predetermined strength to produce a component to be fired; and a dispersion step of dispersing, by a dispersion medium and a surfactant, the component to be fired produced.

And the method for manufacturing a fluororesin dispersion according to one embodiment of the invention, wherein the fluororesin pulverized after firing and the unfired fluororesin powder are both polytetrafluomethylene.

And the method for manufacturing a fluororesin dispersion according to one embodiment of the invention, wherein the fluororesin pulverized after firing is about 50 wt % in the rate.

And the method for manufacturing a fluororesin dispersion according to one embodiment of the invention, wherein the mixing step further includes: a dissimilar property component mixing step of mixing a dissimilar property component having a property different from those of both the fluororesin pulverized after firing and the unfired fluororesin powder.

And a method for manufacturing a fired body according to one embodiment of the invention, the method comprising: a contact step of bringing a fluororesin dispersion manufactured by the method for manufacturing a fluororesin dispersion according to one embodiment of the invention into contact with a contact member; and an integrally firing step of integrally firing the contact member and the fluororesin dispersion brought into contact with each other in the contact step.

And a fluororesin dispersion according to one embodiment of the invention, comprising: a fluororesin pulverized after firing; and an unfired fluororesin powder aggregated after emulsion polymerization, wherein the fluororesin pulverized after firing and the unfired fluororesin powder have been mixed and dispersed by a dispersion medium and a surfactant.

And the fluororesin dispersion according to one embodiment of the invention, wherein the fluororesin pulverized after firing and the unfired fluororesin powder are both polytetrafluoroethylene.

And the fluororesin dispersion according to one embodiment of the invention, wherein the fluororesin pulverized after firing accounts for about 50 wt % of the total fluororesin dispersion.

And the fluororesin dispersion according to one embodiment of the invention, further comprising a dissimilar property component mixed therein, the dissimilar property component having a property different from those of both the fluororesin pulverized after firing and the unfired fluororesin powder.

And a fired body according to one embodiment of the invention, comprising: the fluororesin dispersion according to one embodiment of the invention; and a contact member, wherein the fluororesin dispersion and the contact member have been integrally fired after being brought into contact with each other.

BRIEF DESCRIPTION OF THE DRAWINGS

FIG. 4 is a diagram showing differences between the case where an unfired PTFE powder and the case where a PTFE powder after firing is sintered.

FIG. 15 is a table contrasting and summarizing the tensile strength and tensile elongation of each powder which can be the component to be fired.

DESCRIPTION OF EMBODIMENTS

Hereinafter, an embodiment of a method for manufacturing a fired body of a fluororesin, a fired body of a fluororesin, a method for manufacturing a fluororesin dispersion, a method for manufacturing a fired body, a fluororesin dispersion, and a fired body will be described in detail, with polytetrafluoroethylene (PTFE) given as an example of the fluororesin.

Figure 1:
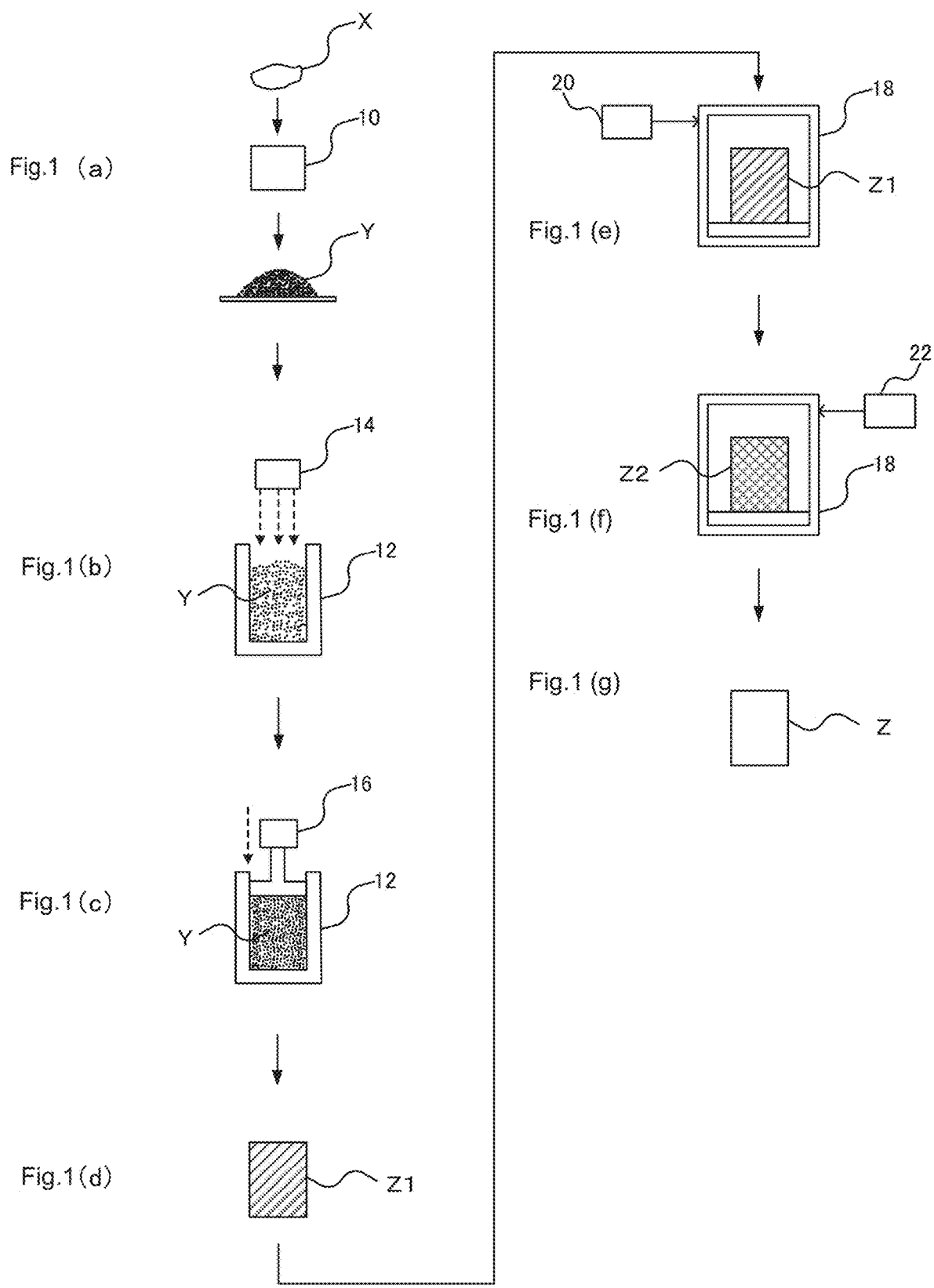
FIG. 1(a) to FIG. 1(g) is a diagram illustrating an outline of the method for manufacturing a fired body of a fluororesin according to one embodiment by processes (a) to (g).

FIG. 1 illustrates an outline of the method for manufacturing a fired body of a fluororesin according to one embodiment by processes (a) to (g). That is, an operator can manufacture a PTFE fired body Z made mainly of fluorite X by conducting the processes in the order of FIGS. 1(a) to (g).

As shown in FIG. 1(a), fluorite X to be a raw material is powdered by a powder producing machine 10 to turn to an unfired PTFE powder (hereinafter, referred to as a first powder), for example. Fluorite X is a mineral mainly containing calcium fluoride ($CaF_2$).

Specifically, the powder producing machine 10 mixes fluorite X with sulfuric acid and heats them to generate hydrogen fluoride (HF) gas, for example. Then, the powder producing machine 10 allows the hydrogen fluoride gas to react with chloroform ($CHCl_3$) to synthesize tetrafluoroethylene (TFE). Then, the powder producing machine 10 polymerizes TFE to produce the first powder. The first powder may be physically produced from fluorite X.

The first powder is a component to be fired Y, which is fired in a furnace body 18 described later. The component to be fired. Y may be a mixture in which a second powder and a dissimilar property component or the like are mixed with the first powder. The second powder is assumed to be a fluororesin powder pulverized after firing. That is, the second powder is a recycled PTFE powder or the like obtained by pulverizing a PTFE product having been once fired. In addition, the dissimilar property component is assumed to be a component having a property different from those of both the first powder and the second powder. That is, the dissimilar property component is a component mixed for changing properties such as creep resistance, compressive strength, hardness, and the like of a fluororesin.

A filling machine 14 uniformly fills the inside of a molding mold 12 with the component to be fired Y (FIG. 1(b)). The component to be fired Y filling the inside of the molding mold 12 is compressed by a compressor 16 at a predetermined pressure for a predetermined time (FIG. 1(c)) to become a premolded body Z1 (FIG. 1(d)).

Then, the premolded body Z1 is fired by a firing machine 20 in a furnace body 18 at a firing temperature of, for example, about 370° C. (FIG. 1(e)). The fired premolded body Z2 is cooled to ordinary temperature by a cooling machine 22 in the furnace body 18 over a predetermined cooling time (FIG. 1(f) and taken out as a PTFE, fired body Z (FIG. 1(g)).

Next, the above-described method for manufacturing a fired body of a fluororesin will be described using a flowchart.

Figure 2:
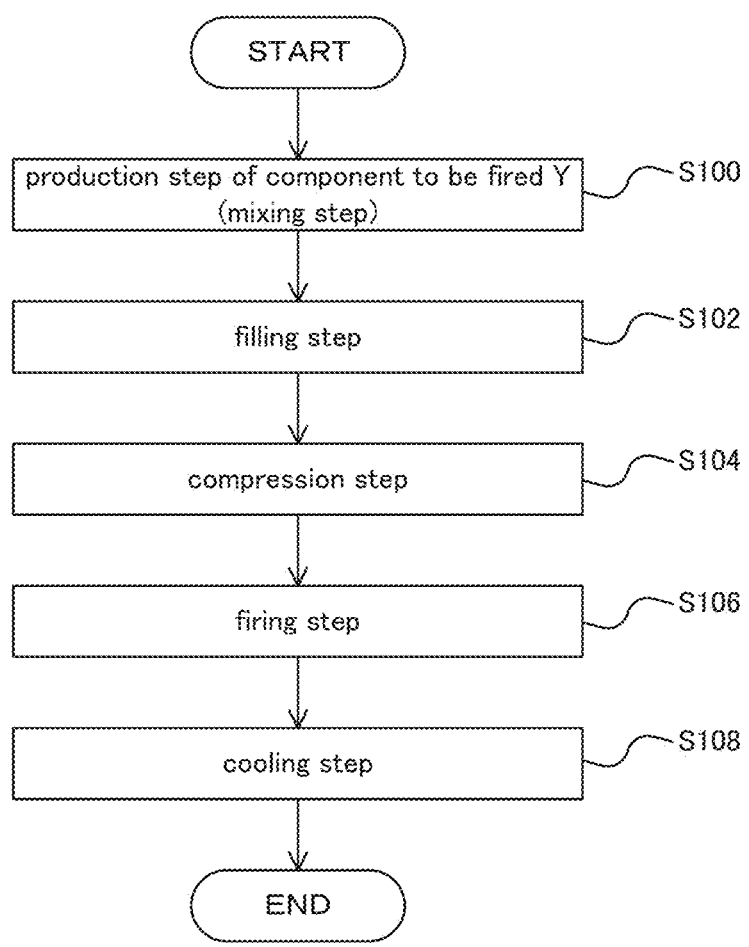
FIG. 2 is a flowchart illustrating an outline of the method for manufacturing a fired body of a fluororesin according to one embodiment.

FIG. 2 is a flowchart illustrating an outline of the method for manufacturing a fired body of a fluororesin according to one embodiment. As shown in FIG. 2, in step S100, the operator firstly produces the powdery component to be fired Y (production step of component to be fired Y). For example, in a case where the second powder is mixed with the first powder, the component to be fired Y is mixed in step S100 (mixing step). In addition, the mixing step may include a dissimilar property component mixing step in which the dissimilar property component is further mixed with the first powder and the second powder.

In step S102, the molding mold 12 is filled with the component to be fired Y (filling step).

In step S104, the component to be fired Y filling the inside of the molding mold 12 is compressed at a predetermined pressure for a predetermined time by the compressor 16 to be the premolded body Z1 (compression step).

In step S106, the premolded body Z1 is fired by the firing machine 20 in the furnace body 18 at a firing temperature of, for example, about 370° C. (firing step).

In step S108, the fired premolded body Z2 is cooled to ordinary temperature by the cooling machine 22 in the furnace body 18 over a predetermined cooling time (cooling step).

As the PTFE fired body Z has good workability and high whiteness, the PTFE fired body Z is an optimal material for expressing sensibility to create arts and crafts, jewelry, and the like.

Effective methods for recycling fluororesins such as PTFE have not been established in the past as described above. This is because the causes of reduction in moldability and reduction in mechanical strength occurring when PTFE having been once fired is remolded have not been clarified.

Therefore, the inventor decided to analyze the mechanism of reduction in strength of PTFE having been once fired and to study an effective method for recycling PTFE.

Conventionally, when PTFE having been once fired is remolded, a cavity is made between PTFE particles. Since the cavity between PTFE particles was thought to be a cause of the reduction in strength of PTFE, the inventor sintered PTFE so as to remove the cavity between PTFE particles and evaluated an effect of the cavity on the strength.

Figure 3A:
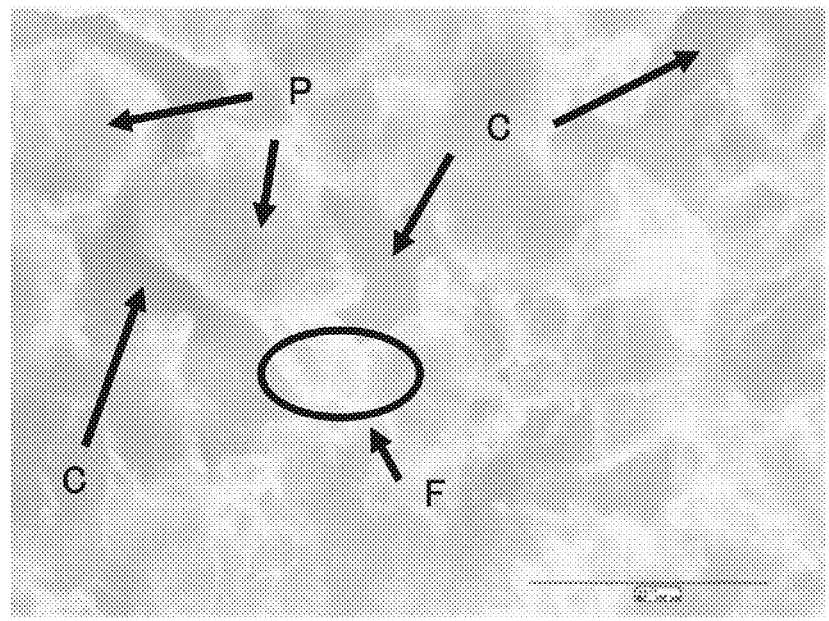
FIG. 3(a) is a SEM photograph of a PTFE remolded product sintered under general conditions.
Figure 3B:
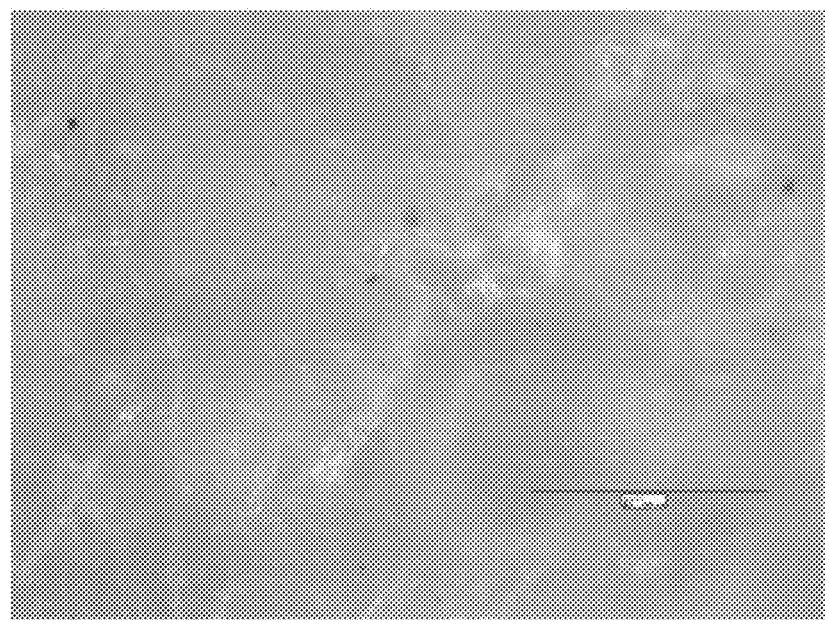
FIG. 3(b) is a SEM photograph of a PTFE remolded product sintered at an intendedly increased compression pressure so as to remove cavities between particles.

FIG. 3 shows magnified photographs comparing presence and absence of the cavity in sintered PTFE remolded products. FIG. 3(a) is a photograph of a PTFE remolded product sintered under general conditions, which is taken by a scanning electron microscope (SEM). FIG. 3(b) is a photograph taken by a SEM of a PTFE remolded product sintered at an intendedly increased compression pressure so as to remove cavities between particles.

As shown in FIG. 3(a), in the PTFE remolded product sintered under general conditions, cavities C are formed between PTFE particles P. and the particles P partly form a fused portion F. On the other hand, as shown in FIG. 3(b), in the PTFE remolded product sintered with conditions such as compression pressure changed so as to remove cavities between particles, the cavities between PTFE particles disappear.

However, even when the cavities between PTFE particles are removed, a streak indicating a grain-boundary face remains between particles, and the particles are not sufficiently fused each other. Therefore, improvement in strength as a remolded product is small, and the strength was a half or less of the strength of PTFE sintered for the first time. That is, it is thought that the reduction in strength occurring when PTFE having been once fired is remolded is caused by not only the cavities between particles. Details will be described later with reference to FIG. 8 and the like.

Next, in a case where PTFE is sintered, differences due to whether PTFE has been sintered previously or not will be compared.

FIG. 4 shows differences between the case where a PTFE powder (an unfired PTFE powder) sintered for the first time is sintered and the case where a powder obtained by pulverizing PTFE having been sintered previously (a PTFE powder after firing) is sintered.

As shown in FIG. 4, in the case where the unfired PTFE powder is sintered, crystallinity is high, the crystalline state is an extended chain, and the melting point in primary heating is 342° C. which is higher than that in secondary heating shown below due to a superheating phenomenon. In addition, in the case where the unfired PTFE powder is sintered, the solidification temperature is 315° C., and the melting point in secondary heating becomes 326° C.

On the other hand, in the case where the PTFE powder after firing is sintered again, an amorphous part is formed, the crystalline state becomes a folded state, and the melting point in primary heating is 327° C. In addition, in the case where the PTFE powder after firing is sintered again, the solidification temperature is 311° C. and the melting point in secondary heating becomes 328° C.

There are almost no impurities, and the color tone is white in both cases where the unfired PTFE powder is sintered and where the PTFE powder after firing is sintered again.

Next, differences between before and after firing in the cases where the unfired PTFE powder is sintered and where the PTFE powder after firing is sintered again will be described with reference to FIG. 5.

Figure 5:
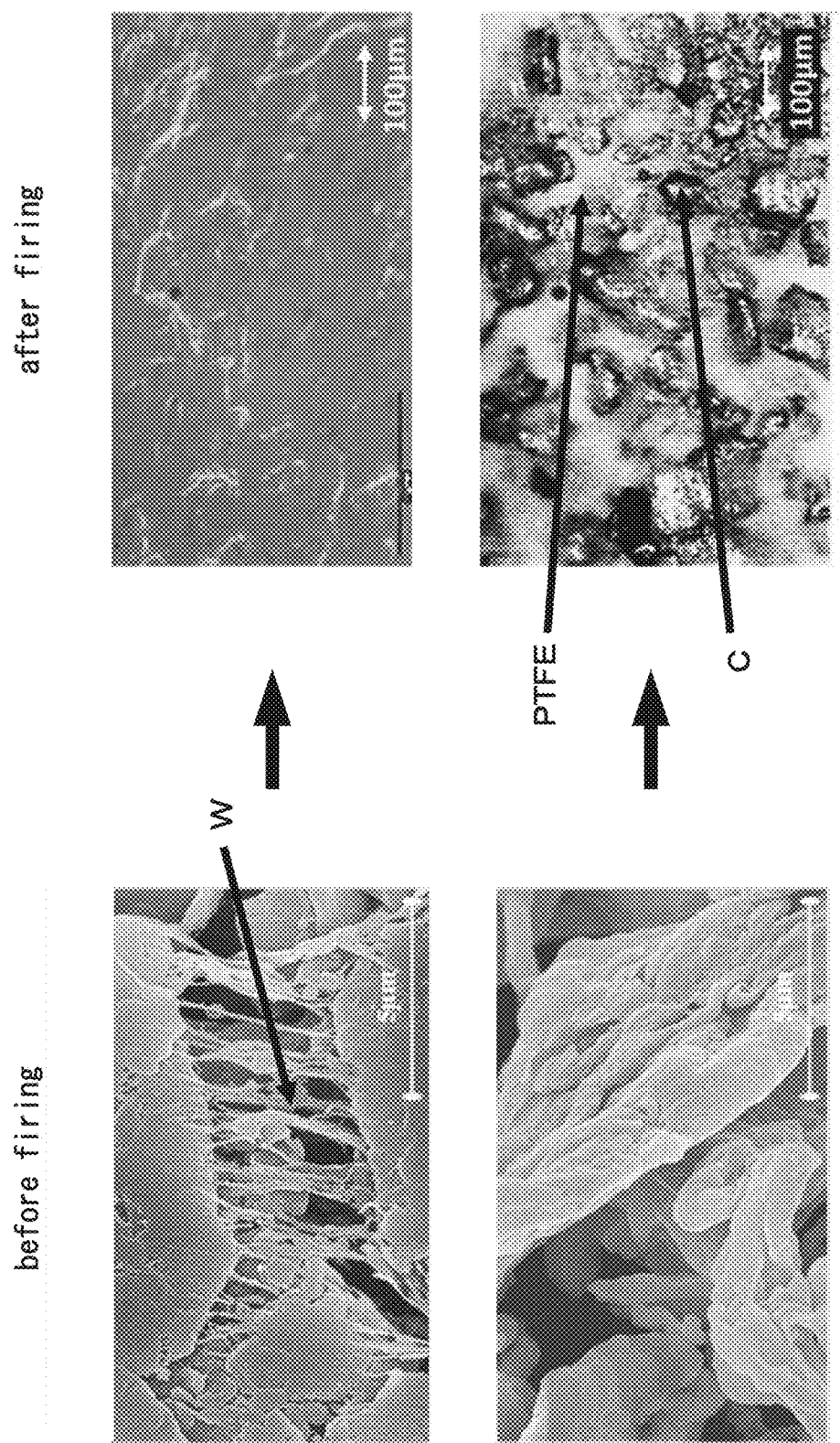
FIG. 5(a) shows SEM photographs showing states before and after firing of the unfired PTFE powder.
FIG. 5(b) shows SEM photographs showing states before and after firing of the PTFE powder after firing.

FIG. 5 shows magnified photographs showing the differences between before and after firing in the cases where the unfired PTFE powder is sintered and where the PTFE powder after firing is sintered again. FIG. 5(a) shows photographs showing states before and after firing of the unfired PTFE powder taken by a SEM. FIG. 5(b) shows photographs showing states before and after firing of the PTFE powder after firing taken by a SEM.

As shown in FIG. 5(a), in the unfired PTFE powder, a lot of fibrous morphology W is found before firing, and the crystallinity increases after firing. On the other hand, as shown in FIG. 5(b), in the PTFE powder after firing, there is no fibrous morphology W before firing, and many cavities C are found after firing.

As shown above, differences in crystal structures, particle shapes, and thermal properties were observed between the case where the unfired PTFFE powder was sintered and the case where the PTFE powder after firing was sintered again.

Next, strength in the case where the unfired PTFE powder is sintered and strength in the case where the PTFE powder after firing is sintered again will be described.

Figure 6:
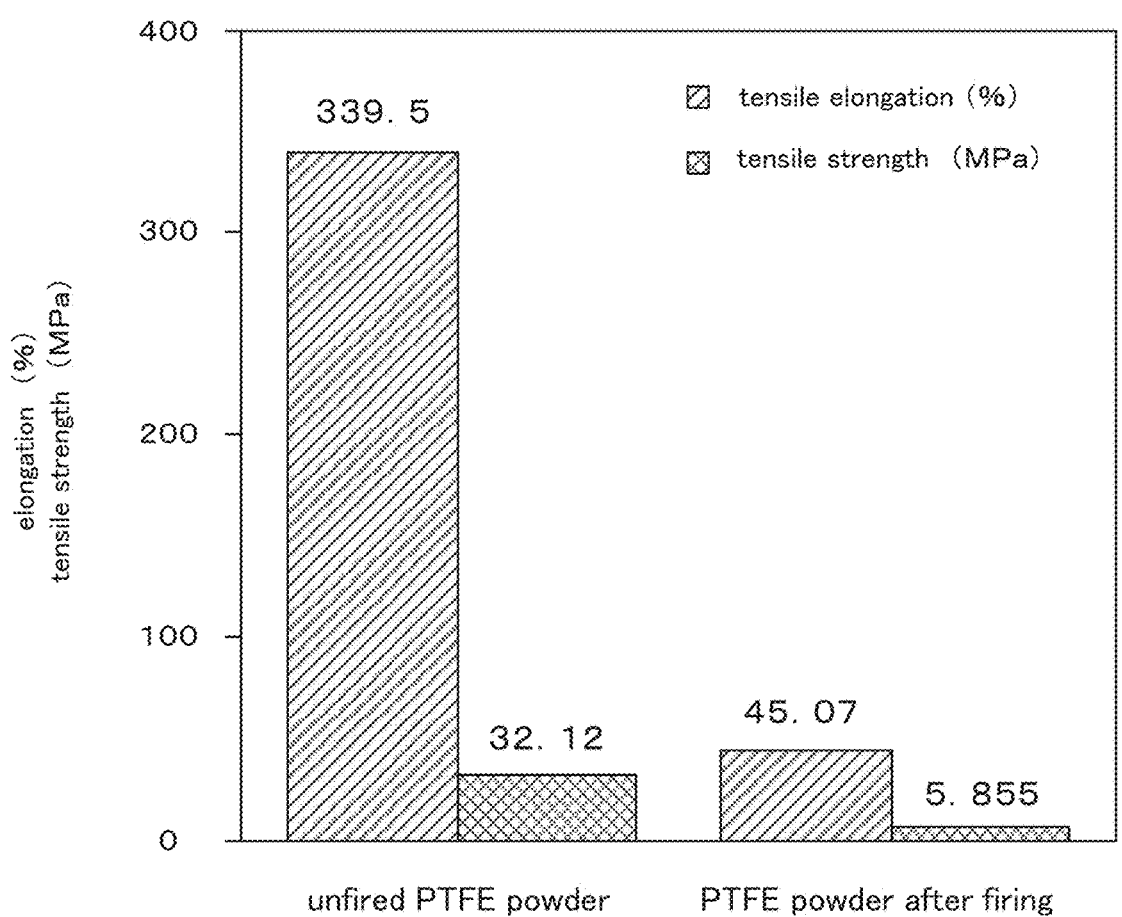
FIG. 6 is a graph comparing tensile strength and tensile elongation in the case where the unfired PTFE powder is sintered with tensile strength and tensile elongation in the case where the PTFE powder after firing is sintered again.

FIG. 6 is a graph comparing tensile strength and tensile elongation in the case where the unfired PTFE powder is sintered with tensile strength and tensile elongation in the case where the PTFE powder after firing is sintered again. As shown in FIG. 6, in the case where the PTFE powder after firing is sintered again, the tensile strength decreases to about 20% of that in the case Where the unfired PTFE powder is sintered. In addition, in the case where the PTFE powder after firing is sintered again, the tensile elongation decreases to about 13% of that in the case where the unfired PTFE powder is sintered.

Figure 7:
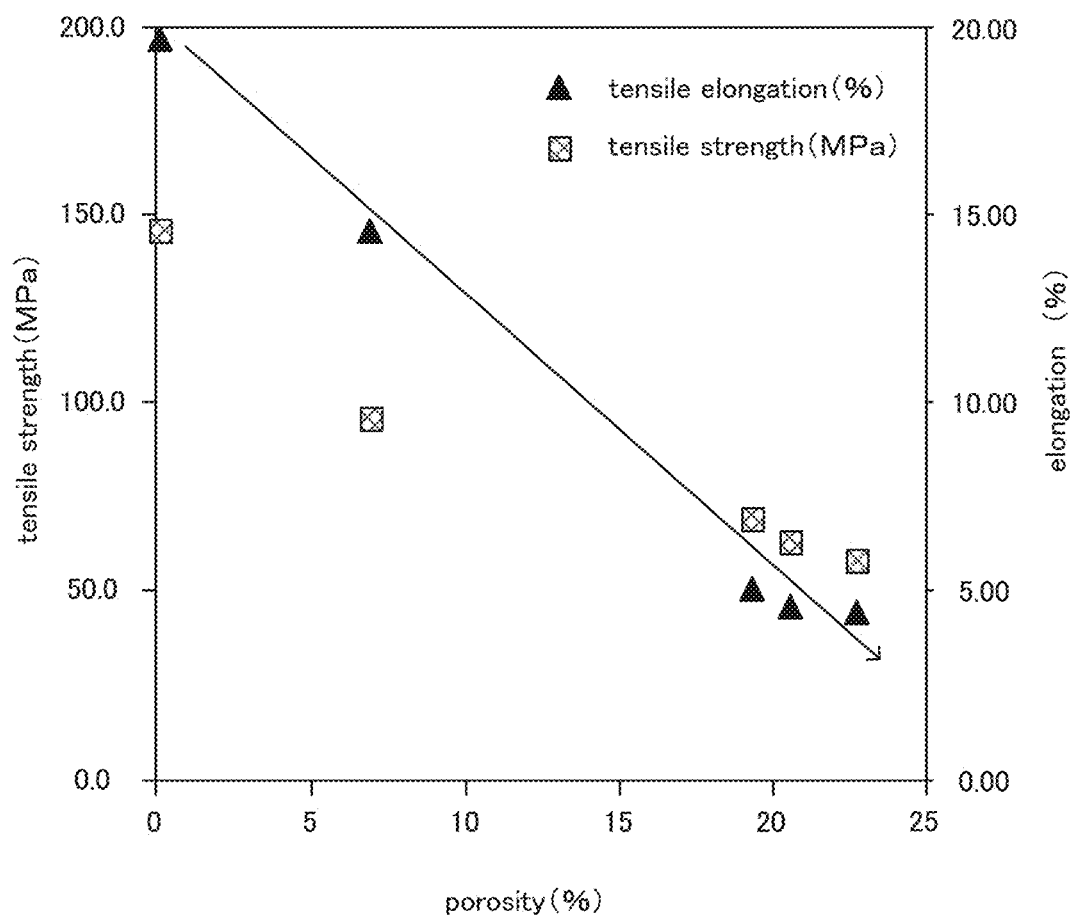
FIG. 7 is a graph showing tensile elongation and tensile strength versus porosity in a case where a PTFE powder is sintered.

FIG. 7 is a graph showing tensile elongation and tensile strength versus porosity in a case where a PTFE powder is sintered. As shown in FIG. 7, it has been confirmed that as the porosity in the case where a PTFE powder is sintered increases, tensile elongation and tensile strength decrease.

Figure 8:
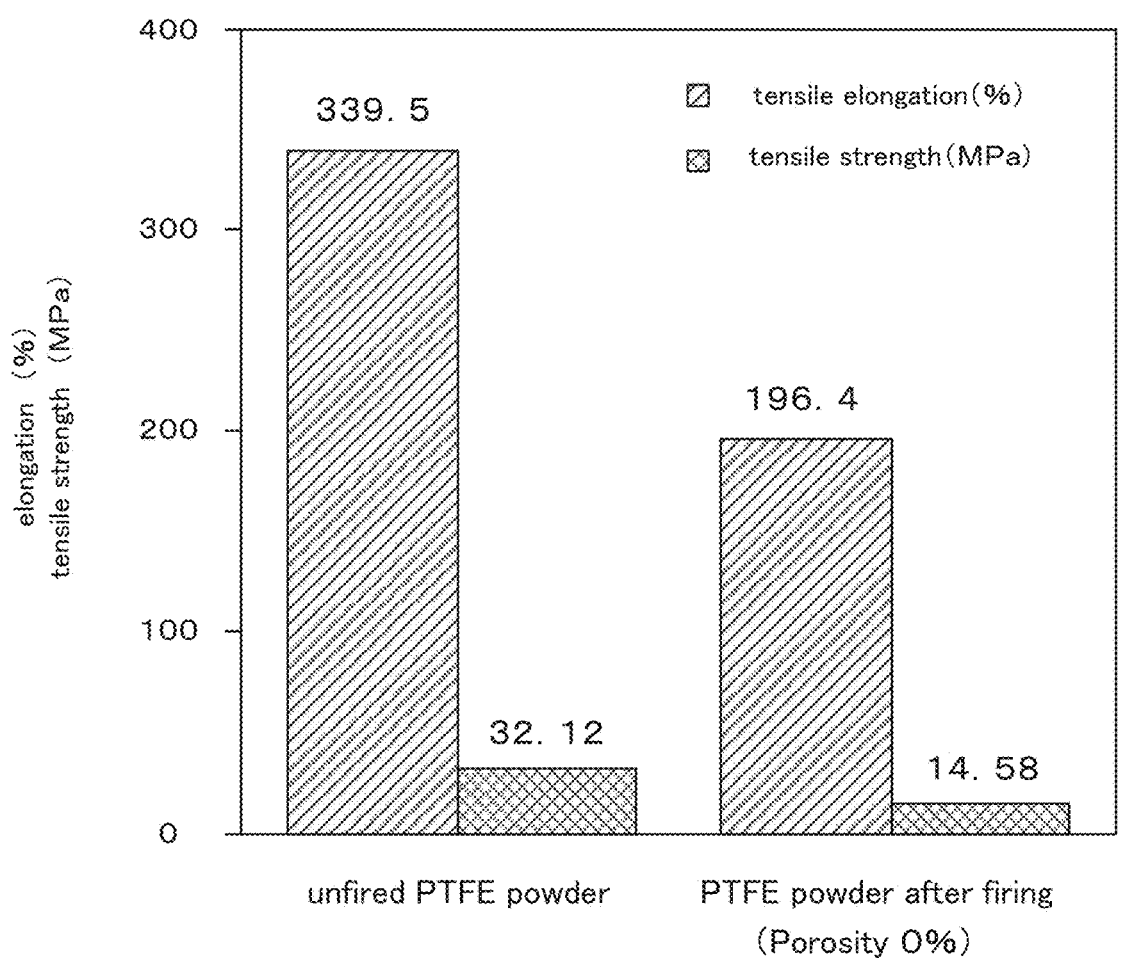
FIG. 8 is a graph comparing tensile strength and tensile elongation in the case where the PTFE powder after firing is sintered again so that the porosity becomes 0% with tensile strength and tensile elongation in the case where the unfired PTFE powder is sintered.

FIG. 8 is a graph comparing tensile strength and tensile elongation in the case where the PTFE powder after firing is sintered again so that the porosity becomes 0% with tensile strength and tensile elongation in the case where the unfired PTFE powder is sintered. As shown in FIG. 8, in the case Where the PTFE powder after firing is sintered again so that the porosity becomes 0%, the tensile strength becomes about 45% of that in the case where the unfired PTFE powder is sintered. In addition, in the case where the PTFE powder after firing is sintered again so that the porosity becomes 0%, the tensile elongation becomes about 60% of that in the case where the unfired PTFE powder is sintered.

In the case where the PTFE powder after firing is sintered again so that the porosity becomes 0%, the tensile strength becomes twice or more than twice higher and the tensile elongation becomes four times or more than four times longer than those in the case where the PTFE powder after firing is sintered again under general conditions (see FIG. 6). As described above, the tensile strength and the tensile elongation are improved when the PTFE powder after tiring is sintered again so that the porosity becomes 0%. However, even when the PTFE powder after firing and the unfired PTFE powder are sintered so that the porosity becomes 0%, respectively, there are significant differences in tensile strength and tensile elongation therebetween.

From these evaluation results, it is thought that the differences in properties between the case where the unfired PTFE powder is sintered and the case where the PTFE powder after firing is sintered again are caused by not only porosity but also by fibrous morphology which is present in the unfired PTFE powder but is absent in the PTFE powder after firing. Specifically, it is thought that PTFE particles are entangled with each other through the fibrous morphology in the unfired PTFE powder, and strong interfacial bonds are formed by firing the unfired PTFE powder with the particles entangled with each other. On the other hand, it is though that strong interfacial bonds are not formed in the PTFE powder after firing even when the PTFE powder after firing is fired since the PTFE powder after firing has no fibrous morphology.

That is, it is thought that the reason why the strength of a molded product obtained by sintering again the PTFE powder after firing is much lower than the strength of a molded product obtained by sintering the unfired PTFE powder is because, in addition to the presence of pores, fibrous morphology disappears through firing, and strong interfacial bonds are not formed between PTFE particles.

Next, a method for improving strength of a molded product obtained by sintering again the PTFE powder after firing will be described As described above, the PTFE powder after firing has no fibrous morphology. On the other hand, fibrous morphology present in the unfired PTFE powder is thought to contribute to the strength of a PTFE molded product obtained by firing. Therefore, the inventor decided to improve the strength of a molded product having been sintered again by adding a PTFE powder to form fibrous morphology to the PTFE powder after firing.

PTFE is obtained by polymerizing TFE. In addition, methods for polymerizing PTFE include suspension polymerization and emulsion polymerization. Hereinafter, a powder obtained through pulverization after suspension polymerization of TFE is referred to as a PTFE molding powder. In addition, a dispersion obtained by subjecting TFE to emulsion polymerization followed by condensation and stabilization is referred to as a PTFE dispersion. The PTFE dispersion is a milky white liquid in which fine particles of PTFE are dispersed in water and has a property of fibrillating when shear force is applied thereto. In addition, a powder obtained through flocculation after emulsion polymerization of TFE is referred to as a PTFE fine powder. For example, the PTFE tine powder is a white powder obtained through aggregation of PTFE fine particles from the PTFFE dispersion and has a property of fibrillating when shear force is applied thereto as in the PTFE dispersion.

Therefore, it is thought that the strength of a molded product of PTFE sintered again can be improved by adding (mixing) a PTFE powder forming fibrous morphology such as the PTFE dispersion or the PTFE fine powder to the PTFE powder after firing.

Next, a specific example of a method for adding a PTFE powder forming fibrous morphology to the PTFE powder after firing will be described.

Figure 9:
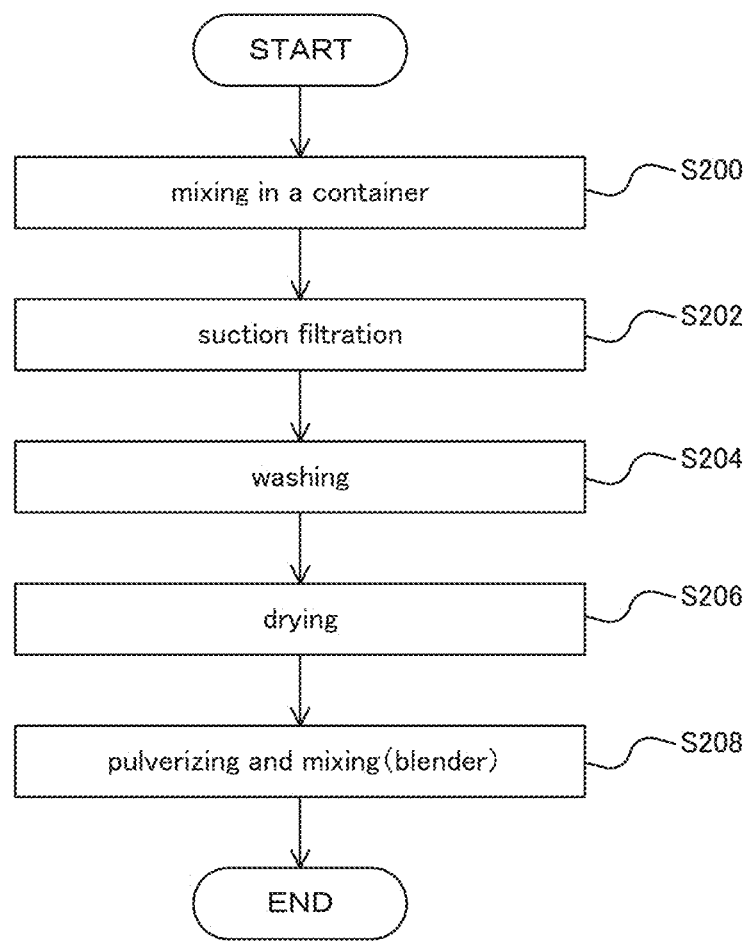
FIG. 9 is a flowchart showing a specific example of a method for adding a PTFE powder forming fibrous morphology to the PTFE powder after firing to produce the component to be fired Y.

FIG. 9 is a flowchart showing a specific example of a method for adding a PTFE powder forming fibrous morphology to the PTFE powder after firing to produce the component to be fired Y. As shown in FIG. 9, in step S200, an operator mixes the PTFE powder after firing and the PTFE dispersion in a container such as a flask using isopropyl alcohol (IPA) or the like as a solvent.

At this time, the PTFE powder after firing is adjusted to have an average particle diameter of, for example, about 50 µm. In addition, the unfired PTFE powder included in the PTFE dispersion is adjusted to have an average particle diameter of, for example, about 0.2 to 0.25 µm.

In step S202, the PTFE powder after firing and the PTFE dispersion which have been mixed using IPA as a solvent are subjected to suction filtration to separate the mixture of powder from IPA or the like.

In step S204, the mixture of powder separated from IPA or the like is washed with water and IPA or the like to remove an emulsifier and the like.

In step S206, the mixture of powder from which an emulsifier and the like are removed is dried.

In step S208, the mixture of powder having been dried is uniformly pulverized and mixed using a blender or the like, for example. That is, a mixture powder in which the PTFE powder after firing and the unfired PTFE powder included in the PTFE dispersion are mixed is produced. The mixture powder produced here is used as the above-described component to be fired Y. That is, the component to be fired Y produced by the method shown in FIG. 9 corresponds to the component to be fired Y produced in the production step (mixing step) of the component to be fired Y shown in FIG. 2 and is fired in the furnace body 18.

While the mixture is washed after the PTFE powder after firing and the PTFE dispersion are mixed in the method shown in FIG. 9, the PTFE powder after firing may be mixed after the PTFE dispersion is washed with IPA or the like and dried. In addition, the PTFE powder after firing and the PTFE fine powder may be mixed to produce a mixture powder.

Next, differences between the component to be fired Y produced by the method shown in FIG. 9 and other PTFE powders will be described.

FIG. 10 shows magnified photographs comparing the component to be fired Y produced by the method shown in FIG. 9 and other PTFE powders. FIG. 10(a) is a SEM photograph of a pulverized PTFE powder after firing and before being sintered again. It is found that no fibrous morphology is observed in the photograph shown in FIG. 10(a).

Figure 10A:
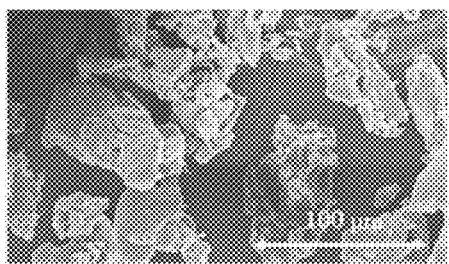
FIG. 10(a) is a SEM photograph of a pulverized PTFE powder after firing and before being sintered again.
Figure 10B:
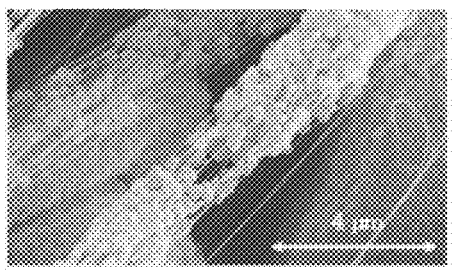
FIG. 10(b) is a SEM photograph of the unfired PTFE powder included in the PTFE dispersion.

FIG. 10(b) is a SEM photograph of the unfired PTFE powder included in the PTFE dispersion. It is found that a lot of fibrous morphology is included in the photograph shown in FIG. 10(b).

Figure 10C:
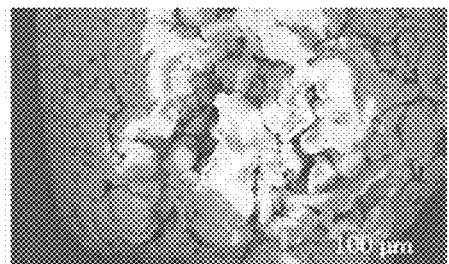
FIG. 10(c) is a SEM photograph of the unfired PTFE molding powder.

FIG. 10(c) is a SEM photograph of the unfired PTFE molding powder. It is found that fibrous morphology as in the photograph shown in FIG. 10(b) is not included in the photograph shown in FIG. 10(c).

Figure 10D:
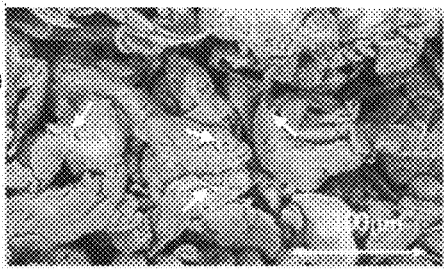
FIG. 10(d) is a SEM photograph of the unfired PTFE powder included in the PTFE dispersion is 50 wt %.

FIG. 10(d) is a SEM photograph of the component to be fired Y produced by the method shown in FIG. 9 (the unfired PTFE powder included in the PTFE dispersion is 50 wt %). It is found that bundles of fibrous morphology gather around particles in the photograph shown in FIG. 10(d).

Figure 10E:
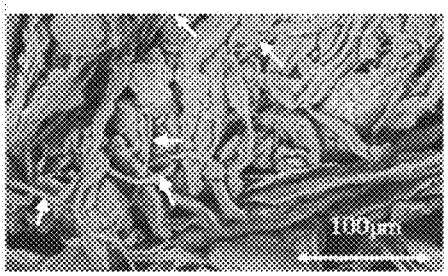
FIG. 10(e) is a SEM photograph of the unfired PTFE powder included in the PTFE dispersion is 80 wt %.

FIG. 10(e) is a SEM photograph of the component to be fired Y produced by the method shown in FIG. 9 (the unfired PTFE powder included in the PTFE dispersion is 80 wt %). It is found that, in the photograph shown in FIG. 10(e), more bundles of fibrous morphology gather around particles than the case of the photograph shown in FIG. 10(d).

Figure 10F:
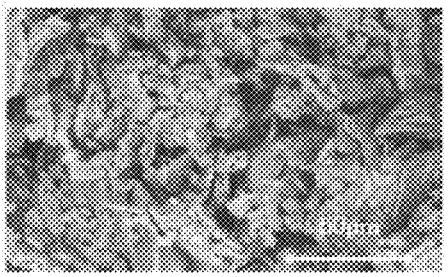
FIG. 10(f) is a SEM photograph of a powder obtained by mixing the PTFE powder after firing and the unfired PTFE molding powder.

FIG. 10(f) is a SEM photograph of a powder obtained by mixing the PTFE powder after firing and the unfired PTFE molding powder (the unfired PTFE molding powder is 50 wt %) It is found that fibrous morphology as in the photographs shown in FIGS. 10(c) and (d) is not included in the photograph shown in FIG. 10(f).

Hereinafter, a PTFE powder forming fibrous morphology such as the unfired PTFE powder (or the unfired PTFE fine powder) aggregated after emulsion polymerization and having been included in the PTFE dispersion is referred to as "first powder to fibrillate" and distinguished from the unfired PTFE molding powder pulverized after suspension polymerization.

Figure 11A:
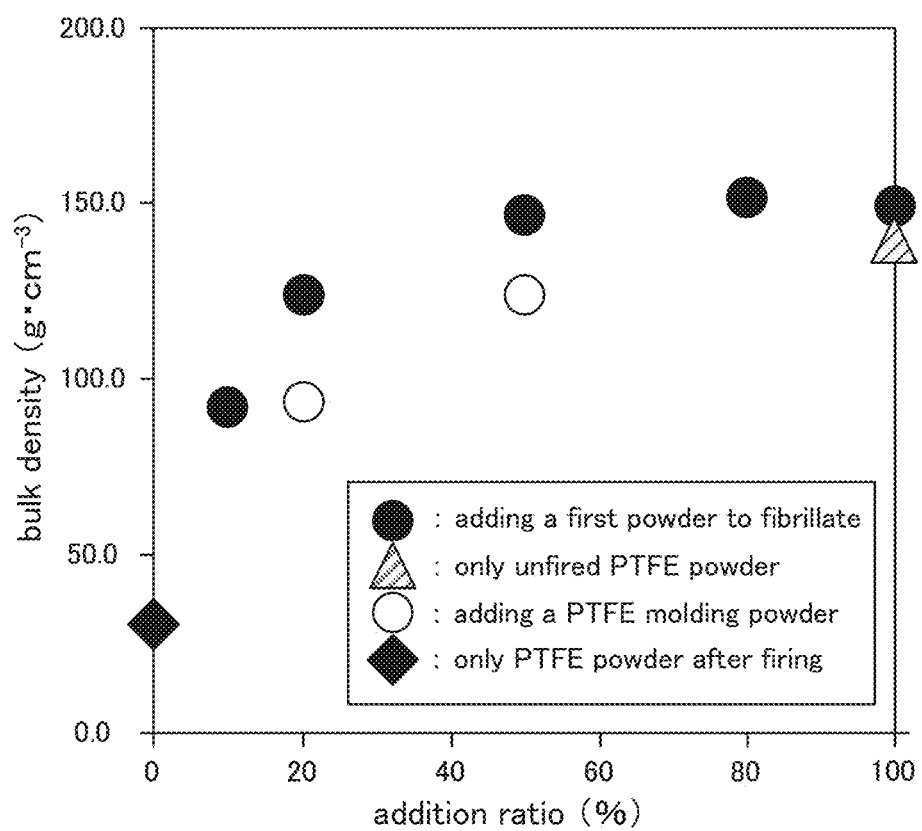
FIG. 11(a) is a graph showing the relationship between the mixing proportion of the "first powder to fibrillate" to the second powder and the bulk density.
Figure 11B:
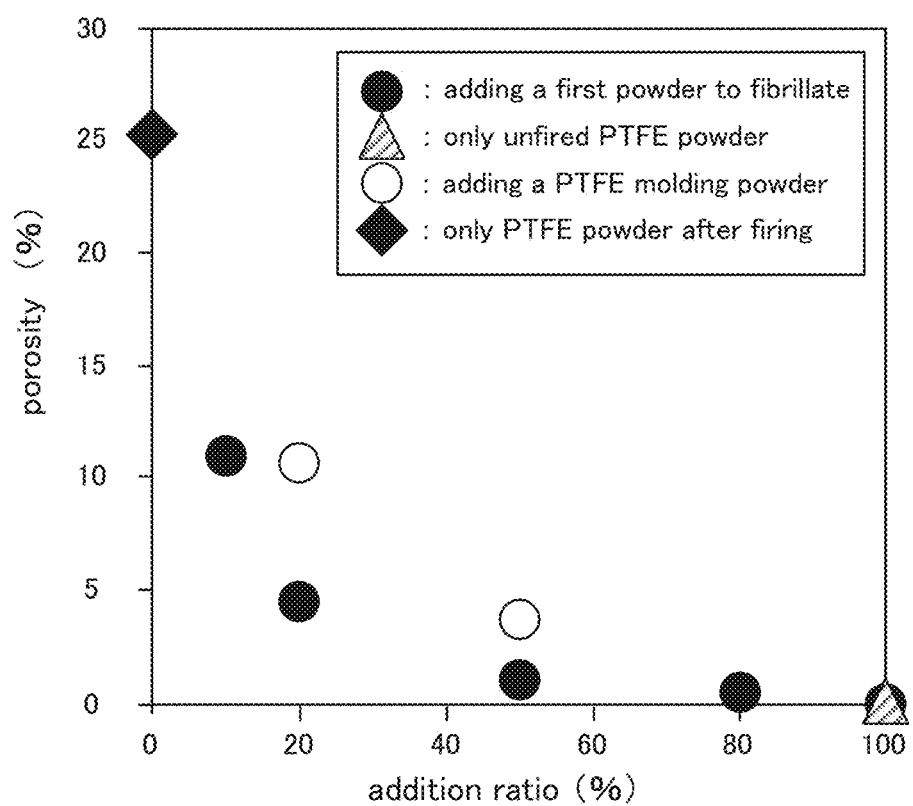
FIG. 11(b) is a graph showing the relationship between the mixing proportion of the "first powder to fibrillate" to the second powder and the porosity after firing.

FIG. 11 shows graphs showing the relationship between addition ratio (mixing proportion) of the "first powder to fibrillate" to the PTFE powder after tiring (second powder) and bulk density and porosity after firing. FIG. 11(a) is a graph showing the relationship between the addition ratio (mixing proportion) of the "first powder to fibrillate" to the second powder and the bulk density. FIG. 11(b) is a graph showing the relationship between the addition ratio (mixing proportion) of the "first powder to fibrillate" to the second powder and the porosity after firing.

As shown in FIG. 11(a), the bulk density increased as the mixing proportion of the "first powder to fibrillate" increased. In addition, when the mixing proportion of the "first powder to fibrillate" became 50 wt % or more, the bulk density became about the same level as the bulk density of the unfired PTFE powder alone.

As shown in FIG. 11(b), the porosity after firing decreased as the mixing proportion of the "first powder to fibrillate" increased. In addition, when the mixing proportion of the "first powder to fibrillate" became 50 wt % or more, the porosity after firing became 1% or less. In addition, when the mixing proportion of the "first powder to fibrillate" became 100 wt % (that is, the first powder to fibrillate alone), the porosity after firing became 0%.

In addition, when the mixing proportion of the "first powder to fibrillate" to the second powder is the same as the mixing proportion of the PTFE molding powder to the second powder, the case where the "first powder to fibrillate" is mixed in is more effective for densification. In FIG. 11, the open circles indicate a mixture including the second powder and the PTFE molding powder.

Figure 12A:
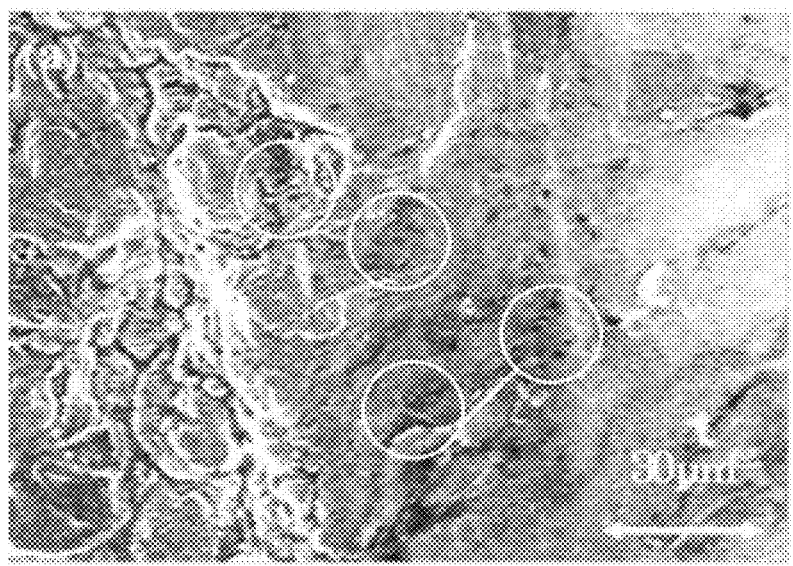
FIG. 12(a) is a SEM photograph of a molded product of PTFE fired after the "first powder to fibrillate" is mixed with the second powder at a proportion of 50 wt %.
Figure 12B:
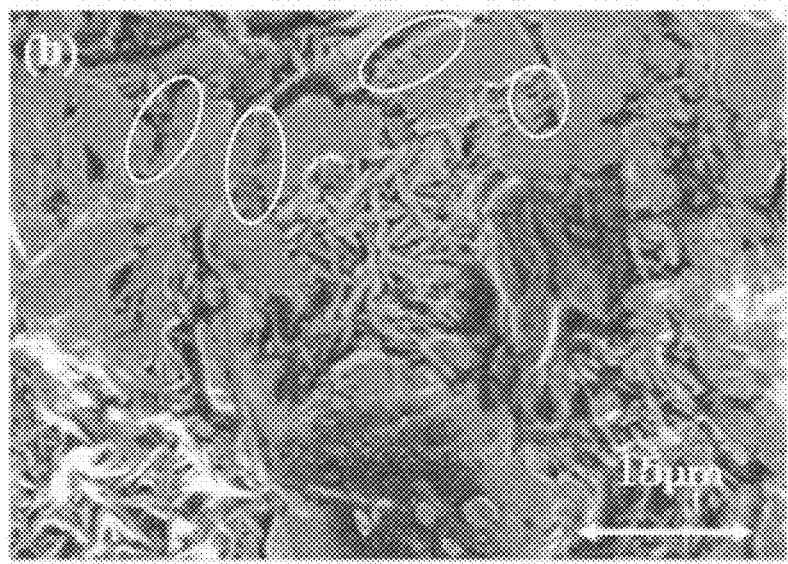
FIG. 12(b) is a SEM photograph of a molded product of PTFE fired after the "first powder to fibrillate" is mixed with the second powder at a proportion of 80 wt %.
Figure 12C:
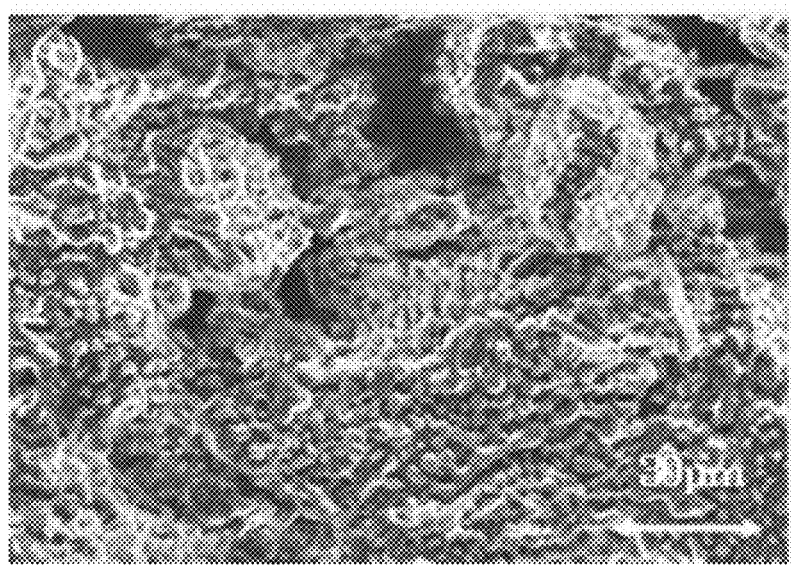
FIG. 12(c) is a SEM photograph of a molded product of PTFE fired after the unfired PTFE molding powder is mixed with the second powder at a proportion of 50 wt %.

FIG. 12 shows magnified photographs of molded products of PTFE fired after the first powder is added to (mixed with) the second powder. FIG. 12(a) is a SEM photograph of a molded product of PTFE fired after the "first powder to fibrillate" is mixed with the second powder at a proportion of 50 wt %. FIG. 12(b) is a SEM photograph of a molded product of PTFE fired after the "first powder to fibrillate" is mixed with the second powder at a proportion of 80 wt %. FIG. 12(c) is a SEM photograph of a molded product of PTFE fired after the unfired PTFE molding powder is mixed with the second powder at a proportion of 50 wt %.

In the molded product of PTFE shown in FIG. 12(a), particles of the "first powder to fibrillate" surround particles of the second powder, the particles of the "first powder to fibrillate" form a matrix during firing, and a structure in which the second powder fills voids of the matrix is formed. In addition, the molded product of PTFE shown in FIG. 12(a) includes segregation due to fibrous morphology of the "first powder to fibrillate," is densified by particles of the "first powder to fibrillate," and is densified as a fired body of PTFE while hardly densified by the second powder.

The molded product of PTFE shown in FIG. 12(b) is more densified by the "first powder to fibrillate" than the molded product of PTFE shown in FIG. 12(a).

It has been confirmed that in a molded product of PTFE fired after the "first powder to fibrillate" is mixed with the second powder at a proportion of less than 50 wt %, particles of the "first powder to fibrillate" do not sufficiently surround the second powder, and particles of the second powder contact with each other. In addition, the lower the proportion of the mixed "first powder to fibrillate" is, the more the particles of the second powder contact with each other, and a three-dimensional skeleton structure is formed by the second powder. That is, densification is more likely to depend on the particles of the second powder, and porosity could not be close to 0%.

In the molded product of PTFE shown in FIG. 12(c), voids due to the absence of fibrous morphology are observed after firing, even though the unfired PTFE molding powder is mixed with the second powder at a proportion of 50 wt %, and the molded product of PTFE shown in FIG. 12(c) is not densified so much as the case where the "first powder to fibrillate" is mixed in.

Figure 13A:
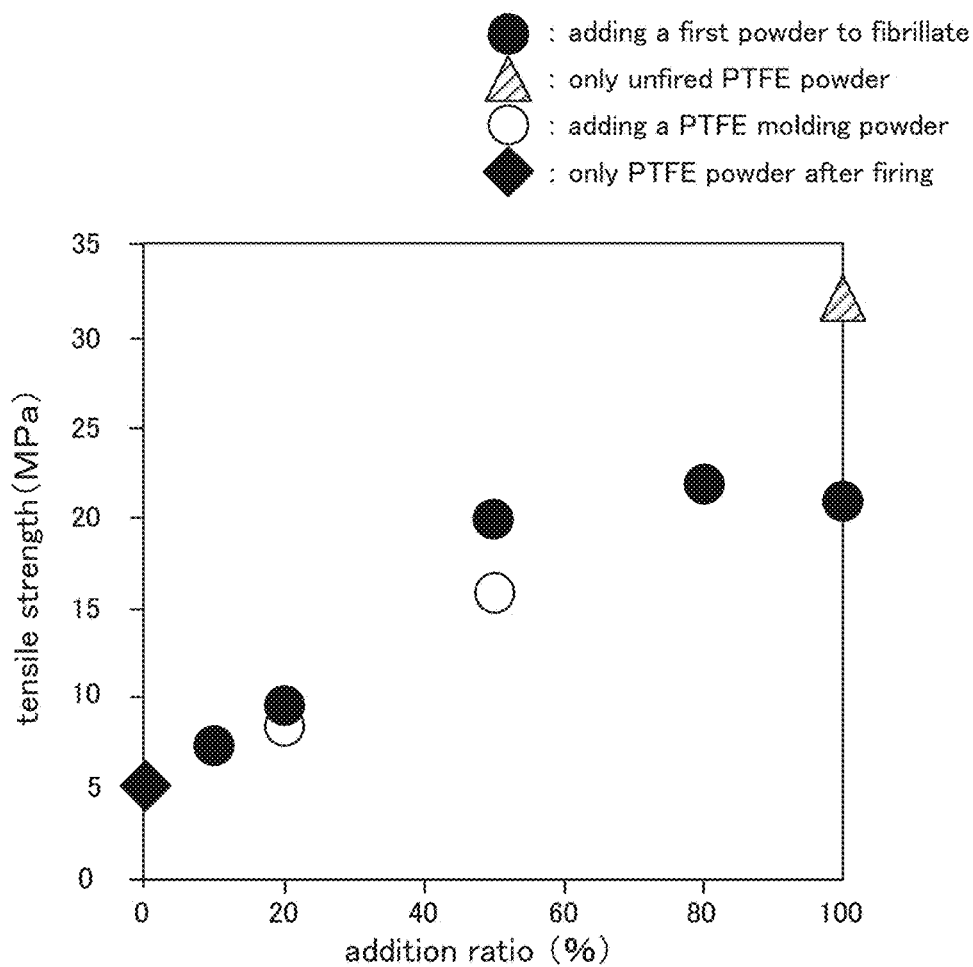
FIG. 13(a) is a graph showing the relationship between the mixing proportion of the "first powder to fibrillate" to the second powder and the tensile strength after firing.
Figure 13B:
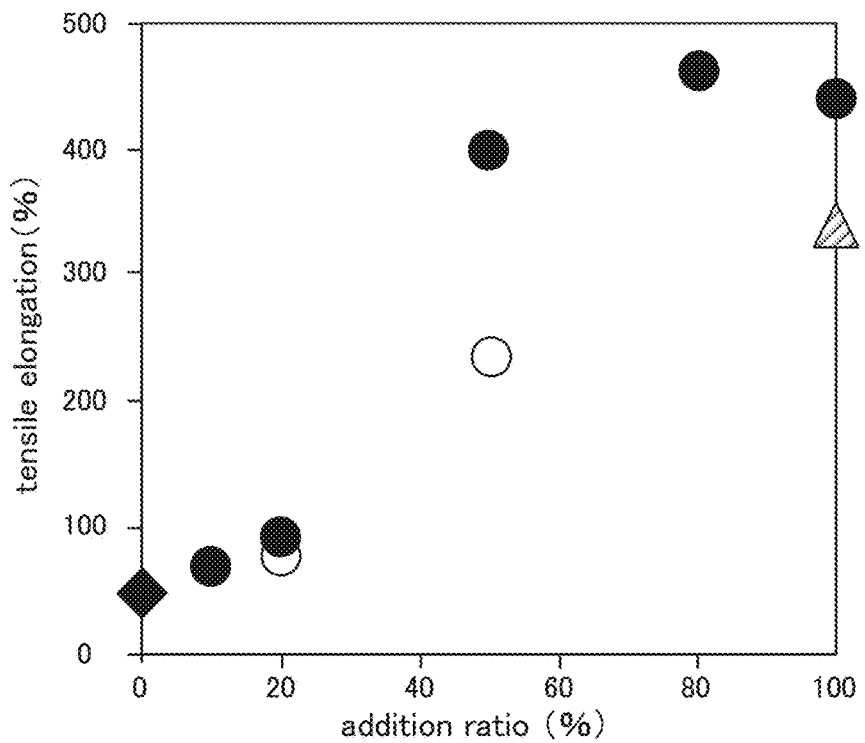
FIG. 13(b) is a graph showing the relationship between the mixing proportion of the "first powder to fibrillate" to the second powder and the tensile elongation after firing.

FIG. 13 shows graphs showing the relationship between addition ratio (mixing proportion) of the "first powder to fibrillate" to the PTFE powder after firing (second powder) and tensile strength and tensile elongation after firing. FIG. 13(a) is a graph showing the relationship between the addition ratio (mixing proportion) of the "first powder to fibrillate" to the second powder and the tensile strength after firing. FIG. 13(b) is a graph showing the relationship between the addition ratio (mixing proportion) of the "first powder to fibrillate" to the second powder and the tensile elongation after firing.

As shown in FIG. 13(a), the tensile strength increased as the mixing proportion of the "first powder to fibrillate" increased. In addition, when the mixing proportion of the "first powder to fibrillate" was increased from 0 wt % to 50 wt %, the tensile strength increased from about 5 MPa to about 21 MPa (about the quadruple). On the other hand, even when the mixing proportion of the "first powder to fibrillate" is increased to more than 50 wt %, the tensile strength gradually increases compared with the case where the mixing proportion of the "first powder to fibrillate" is 50 wt %.

In addition, in the cases where the mixing proportion of the "first powder to fibrillate" is 80 wt % and 100 wt %, the tensile strength is about 23 MPa, and is about 40% lower than the tensile strength in the case where the unfired PTFE powder is fired alone.

As shown in FIG. 13(b), the tensile elongation also increased as the mixing proportion of the "first powder to fibrillate" increased. In addition, when the mixing proportion of the "first powder to fibrillate" was increased from 0 wt % to 50 wt %, the tensile elongation increased from about 50% to about 400% (about the octuple). On the other hand, even when the mixing proportion of the "first powder to fibrillate" is increased to more than 50 wt %, the tensile elongation gradually increases compared with the case where the mixing proportion of the "first powder to fibrillate" is 50 wt %.

In addition, in the case where the mixing proportion of the "first powder to fibrillate" is 80 wt %, the tensile elongation is about 460% and improves by about 30% compared with the tensile elongation in the case where the unfired PTFE powder is fired alone. That is, a new fluororesin which is different in properties from the unfired PTFE is produced by mixing the "first powder to fibrillate" with the PTFE powder after firing (second powder).

In addition, in the case where the mixing proportion of the "first powder to fibrillate" to the second powder is the same as the mixing proportion of the PTFE molding powder to the second powder, both the tensile strength and the tensile elongation are higher values in the case where the "first powder to fibrillate" is mixed in. In FIG. 13, the open circles indicate a mixture including the second powder and the PTFE molding powder.

Figure 14:
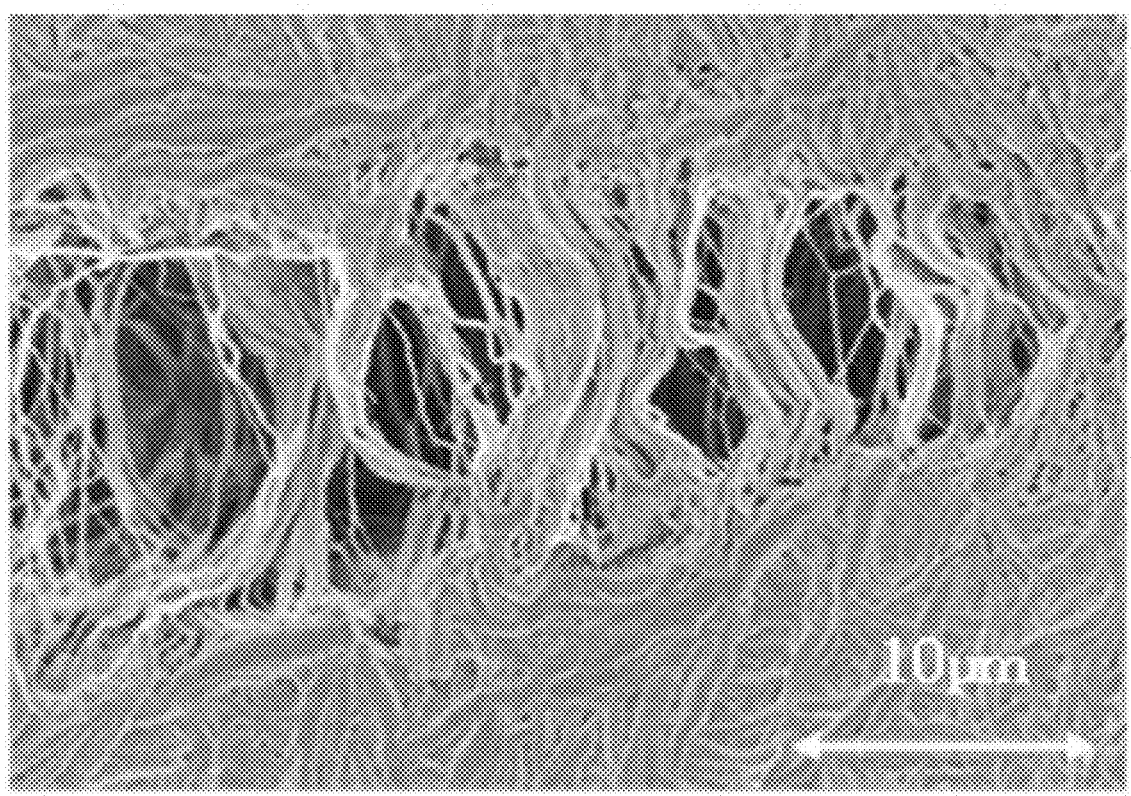
FIG. 14 is a SEM photograph of a molded product of PTFE fired after the "first powder to fibrillate" is mixed with the second powder at a mixing proportion of 50 wt %.

FIG. 14 is a photograph taken by a SEM of a molded product of PTFE fired after the "first powder to fibrillate" is mixed with the second powder at a mixing proportion of 50 wt %. As shown in FIG. 14, fibrous morphology is formed in the molded product of PTFE fired after the "first powder to fibrillate" is mixed with the second powder. The fiber diameter of the fibrous morphology is about the same as the diameter of the fiber bundle in which thin fibers formed through fibrillation of "first powder to fibrillate" bunch with fine particles interposed therebetween.

FIG. 15 is a table contrasting and summarizing the tensile strength and tensile elongation of each powder which can be the component to be fired Y described above. As shown in FIG. 15, the tensile strength and tensile elongation of the component to be fired Y after firing are changed by varying the mixing proportion of the "first powder to fibrillate." Therefore, it is made possible to design the tensile strength and tensile elongation of a PTFE molded product after firing by setting the mixing proportion of the "first powder to fibrillate" in the component to be fired Y in advance according to tensile strength and tensile elongation required for each PTFE molded product.

Next, a method for manufacturing a fluororesin dispersion using the component to be fired Y with the "first powder to fibrillate" mixed therein will be described.

Figure 16:
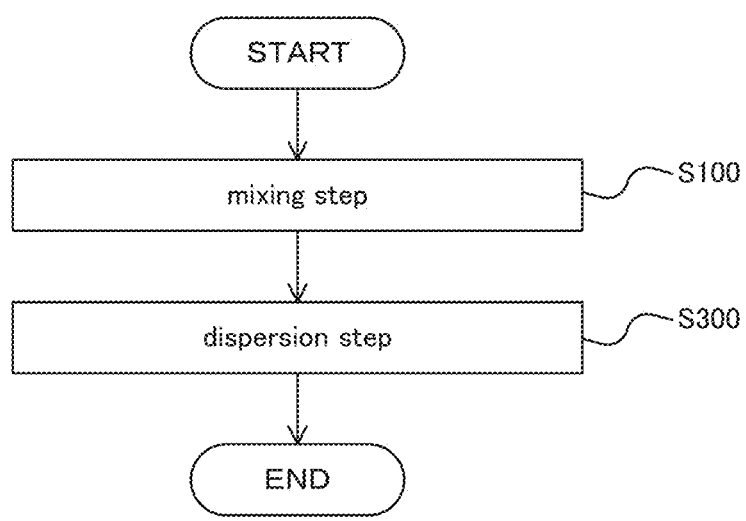
FIG. 16 is a flowchart showing the method for manufacturing a fluororesin dispersion using the component to be fired Y with the "first powder to fibrillate" mixed therein.

FIG. 16 is a flowchart showing the method for manufacturing a fluororesin dispersion using the component to be fired Y with the "first powder to fibrillate" mixed therein. In FIG. 16, step S100 is substantially the same step as the production step (mixing step) of the component to be fired Y shown as step S100 in FIG. 2 and as the methods (steps S200 to S208) for producing the component to be fired Y shown in FIG. 9.

In step S300, the component to be fired Y produced in the mixing step of step S100 is dispersed by using a dispersing medium such as water and an emulsifier (surfactant) or the like, for example, to make the component to be fired Y into a colloidal state like an emulsified liquid (dispersion step).

That is, according to the method shown in FIG. 16, a fluororesin dispersion in an emulsified liquid state, which includes the component to be fired Y with the "first powder to fibrillate" mixed therein can be manufactured.

Next, a method for manufacturing a fired body using the fluororesin dispersion including the component to be fired Y with the "first powder to fibrillate" mixed therein will be described.

Figure 17:
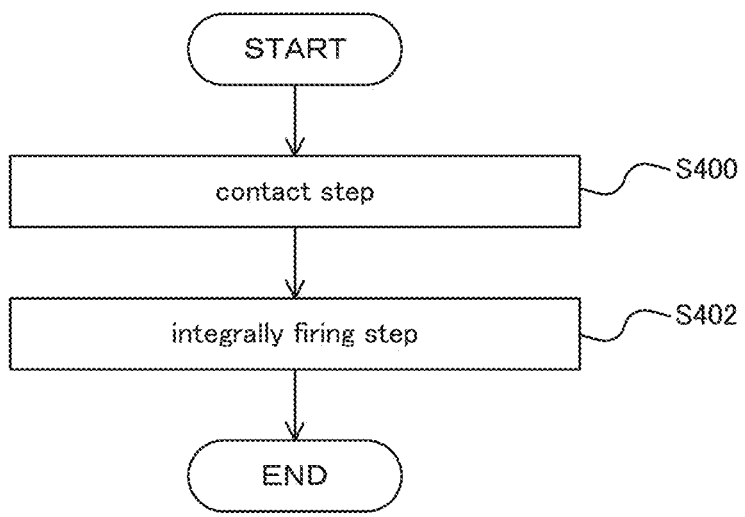
FIG. 17 is a flowchart showing the method for manufacturing a fired body using the fluororesin dispersion including the component to be fired Y with the "first powder to fibrillate" mixed therein.

FIG. 17 is a flowchart showing the method for manufacturing a fired body using the fluororesin dispersion including the component to be fired Y with the "first powder to fibrillate" mixed therein. As shown in FIG. 17, in step S400, an operator performs a process to bring the fluororesin dispersion including the component to be fired Y with the "first powder to fibrillate" mixed therein (see FIG. 16) into contact with a contact member (contact step).

Here, examples of the contact member include glass fibers and metal plates. In addition, examples of the contacting process in the contact step include a process to impregnate glass fibers with the above-described fluororesin dispersion and a process to coat a metal plate with the above-described fluororesin dispersion.

In step S402, the operator performs a process to integrally fire the contact member and the above-described fluororesin dispersion brought into contact with each other in the contact step (integrally firing step).

That is, according to the method shown in FIG. 17, a glass cloth coating, a film material for tents, and the like in which the fluororesin dispersion including the component to be fired Y with the "first powder to fibrillate" mixed therein is integrally fired can be manufactured.

Next, features and properties of a fired body obtained by mixing the PTFE powder after firing and the PTFE fine powder followed by firing in the furnace body 18 will be described.

First, the PTFE powder after firing is mixed with the PTFE fine powder, with the content rate of the PTFE fine powder gradually increased, and respective states before firing are photographed by a SEM. When the content rate of the PTFE fine powder was 30% or less, many spaces were observed after mixing. However, when the content rate of the PTFE fine powder became about 60% or more, it was observed that spaces were almost removed after mixing. At this time, PTFE particles after firing are surrounded by particles of the PTFE fine powder.

In addition, it was confirmed by photographing a molded product of PTFE fired after mixing the PTFE powder after firing and the PTFE fine powder using a SEM that is when the content rate of the PTFE fine powder became about 70% or more, the surface got almost smooth. Here, it is thought that compaction properties and conditions of spaces (especially, porosity) at the time of preliminary molding before firing directly affect the resultant product after firing.

Figure 18:
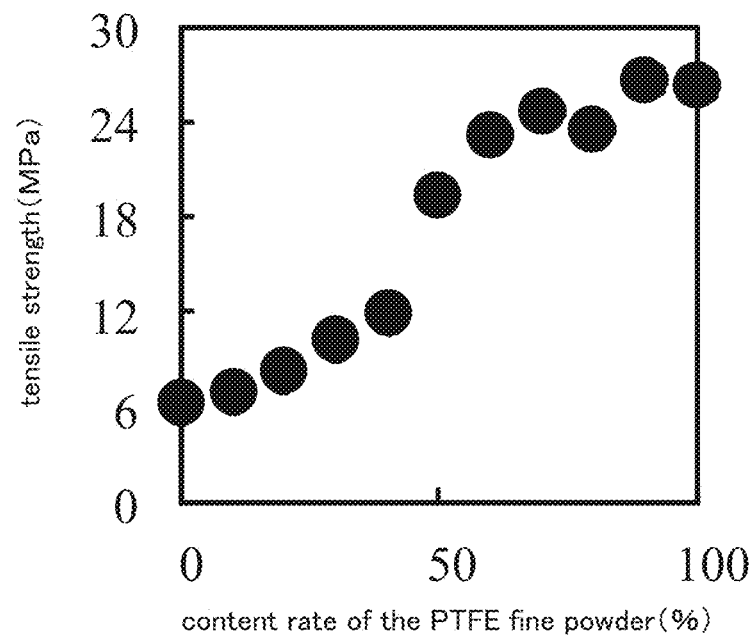
FIG. 18 is a graph showing the relationship between the content rate of the PTFE fine powder and tensile strength with respect to fired bodies in which the PTFE powder after firing and the PTFE fine powder are mixed.

FIG. 18 is a graph showing the relationship between the content rate of the PTFE fine powder and tensile strength with respect to fired bodies in which the PTFE powder after firing and the PTFE fine powder are mixed. Here, when the content rate of the PTFE fine powder becomes 50%, the strength is increased by about 3.12 times compared with the case where the content rate of the PTFE; fine powder is 0%. In addition, when the content rate of the PTFE fine powder becomes 50%, the obtained strength is about 74% of that in the case where the content rate of the PTFE fine powder is 100%.

Figure 19:
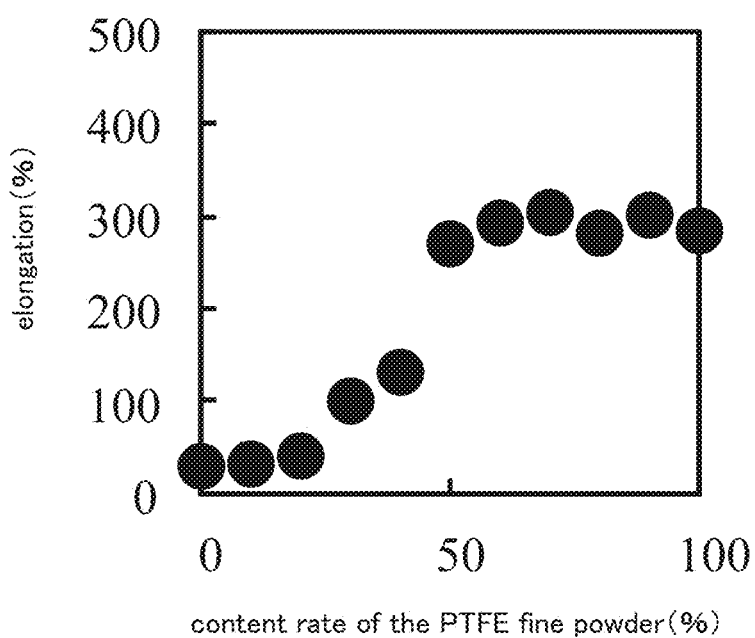
FIG. 19 is a graph showing the relationship between the content rate of the PTFE fine powder and tensile elongation with respect to fired bodies in which the PTFE powder after firing and the PTFE fine powder are mixed.

FIG. 19 is a graph showing the relationship between the content rate of the PTFE fine powder and tensile elongation with respect to fired bodies in which the PTFE powder after firing and the PTFE fine powder are mixed. Here, when the content rate of the PTFE fine powder becomes 50%, the percentage elongation is increased by about 8.75 times compared with the case where the content rate of the PTFE fine powder is 0%. In addition, when the content rate of the PTFE fine powder becomes 50%, the obtained percentage elongation is about 94% of that in the case where the content rate of the PTFE fine powder is 100%.

Figure 20:
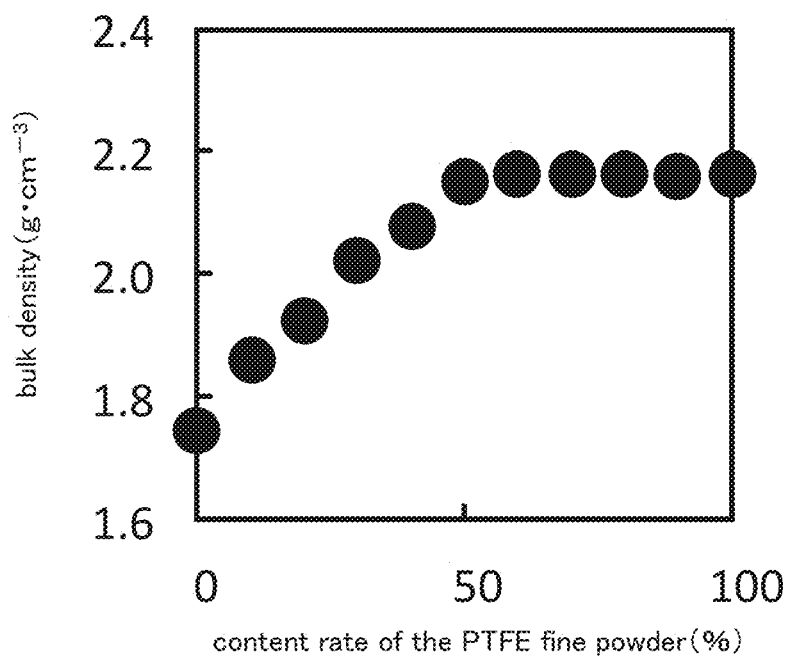
FIG. 20 is a graph showing the relationship between the content rate of the PTFE fine powder and bulk density with respect to fired bodies in which the PTFE powder after firing and the PTFE fine powder are mixed.

FIG. 20 is a graph showing the relationship between the content rate of the PTFE fine powder and bulk density with respect to fired bodies in which the PTFE powder after firing and the PTFE fine powder are mixed. Here, when the content rate of the PTFE fine powder becomes 50% or more, the bulk density becomes almost constant.

Figure 21:
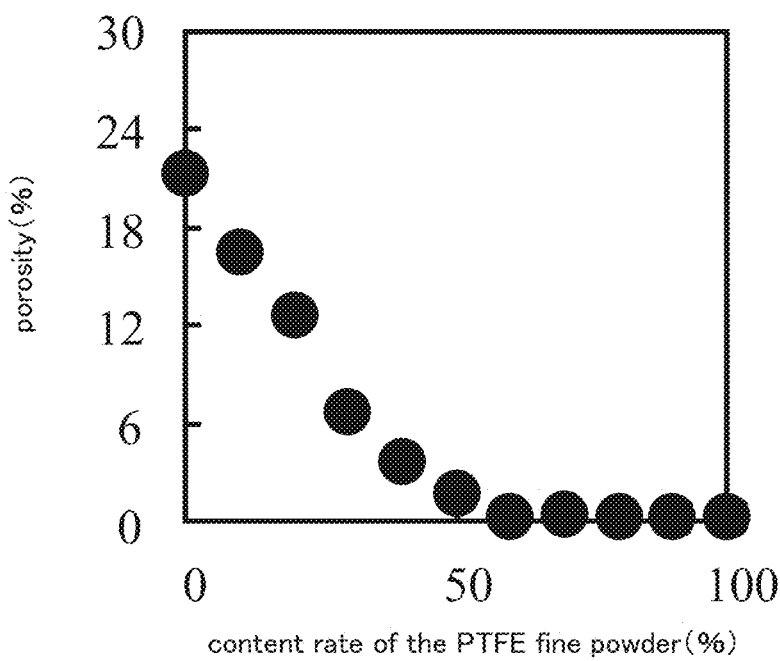
FIG. 21 is a graph showing the relationship between the content rate of the PTFE fine powder and porosity with respect to fired bodies in which the PTFE powder after firing and the PTFE fine powder are mixed.

FIG. 21 is a graph showing the relationship between the content rate of the PTFE fine powder and porosity with respect to fired bodies in which the PTFE powder after firing and the PTFE fine powder are mixed. Here, when the content rate of the PTFE fine powder becomes 50%, the porosity becomes 1.7%. In addition, when the content rate of the PTFE fine powder becomes 60% or more, the porosity becomes almost constant.

As described above, the fired bodies in which the PTFE powder after firing and the PTFE fine powder were mixed and the fired bodies in which the PTFE powder after firing and the PTFE dispersion were mixed had tendencies of properties similar to each other. However, on comparing the fired bodies in which the PTFE powder after firing and the PTFE fine powder were mixed with the fired bodies in which the PTFE powder after firing and the PTFE dispersion were mixed, the fired bodies in which the PTFE powder after firing and the PTFE dispersion were mixed tended to have higher strength.

For example, when the content rate of the PTFE fine powder is 50%, the strength is about 20% lower than that in the case where the content rate of the PTFE dispersion is 50%. This is thought be because the PTFE fine powder in powder form has lower dispersibility than the PTFE powder after firing. That is, the PTFE dispersion is thought to surround particles of the PTFE powder after firing more uniformly and to have better dispersibility.

The fluororesin of the present application is a polymer material including a fluorine atom and may be any of PTFE, a tetrafluoroethylene-perfluoro alkyl vinyl ether copolymer (PFA), a tetrafluoroethylene-hexafluoropropylene copolymer (FEP), tetrafluoroethylene-ethylene copolymer (ETFE), polyvinylidene fluoride (PVDF), polychlorotrifluoroethylene (PCTFE), a chlorotrifluoethylene-ethylene copolymer (ECTFE), and the like, for example, and they may be mixed (in a powdery state, for example).

As described above, according to the embodiments described above, an unfired fluororesin powder aggregated after emulsion polymerization is mixed in, and therefore, a fired body of a fluororesin, a fluororesin dispersion, and a fired body can be manufactured efficiently using a fluororesin pulverized after firing.

The invention claimed is:

1. A method for manufacturing a fired body of a fluororesin, comprising:
   a mixing step of mixing a fluororesin pulverized after firing and an unfired fluororesin powder aggregated after emulsion polymerization at a mixing rate based on a desired tensile quality of the fired body, to produce a component to be fired; and
   a firing step of firing the component to produce the fired body.

2. The method for manufacturing a fired body of a fluororesin according to claim 1, wherein
   the fluororesin pulverized after firing and the unfired fluororesin powder are both polytetrafluoroethylene.

3. The method for manufacturing a fired body of a fluororesin according to claim 2, wherein
   the fluororesin pulverized after firing is mixed at a rate of about 50 wt %.

4. The method for manufacturing a fired body of a fluororesin according to claim 1, wherein
   the mixing step further includes:
   a dissimilar property component mixing step of mixing a dissimilar property component having a property different from those of both the fluororesin pulverized after firing and the unfired fluororesin powder.

5. A fired body of a fluororesin, comprising:
   a fluororesin pulverized after firing; and
   an unfired fluororesin powder aggregated after emulsion polymerization, wherein
   the fluororesin pulverized after firing and the unfired fluororesin powder have been fired after being mixed.

6. The fired body of a fluororesin according to claim 5, wherein
   the fluororesin pulverized after firing and the unfired fluororesin powder are both polytetrafluoroethylene.

7. The fired body of a fluororesin according to claim 6, wherein
   the fluororesin pulverized after firing accounts for about 50 wt % of the total fired body.

8. The fired body of a fluororesin according to claim 5, further comprising a dissimilar property component mixed therein, the dissimilar property component having a property different from those of both the fluororesin pulverized after firing and the unfired fluororesin powder.

9. A method for manufacturing a fluororesin dispersion, comprising:
   a mixing step of mixing a fluororesin pulverized after firing and an unfired fluororesin powder aggregated after emulsion polymerization at a mixing rate to produce a component to be fired; and
   a dispersion step of dispersing, by a dispersion medium and a surfactant, the component to be fired;
   wherein the mixing rate is selected to produce a desired tensile quality of the component after the firing.

10. The method for manufacturing a fluororesin dispersion according to claim 9, wherein
    the fluororesin pulverized after firing and the unfired fluororesin powder are both polytetrafluoroethylene.

11. The method for manufacturing a fluororesin dispersion according to claim 10, wherein
    the fluororesin pulverized after firing is mixed at a rate of about 50 wt %.

12. The method for manufacturing a fluororesin dispersion according to claim 9, wherein
    the mixing step further includes:
    a dissimilar property component mixing step of mixing a dissimilar property component having a property different from those of both the fluororesin pulverized after firing and the unfired fluororesin powder.

13. A method for manufacturing a fired body, the method comprising:
    a contact step of bringing a fluororesin dispersion manufactured by the method for manufacturing a fluororesin dispersion according to claim 9 into contact with a contact member; and
    an integrally firing step of integrally firing the contact member and the fluororesin dispersion brought into contact with each other in the contact step.

14. A fluororesin dispersion, comprising:
    a fluororesin pulverized after firing; and
    an unfired fluororesin powder aggregated after emulsion polymerization, wherein
    the fluororesin pulverized after firing and the unfired fluororesin powder have been mixed and dispersed by a dispersion medium and a surfactant.

15. The fluororesin dispersion according to claim 14, wherein
    the fluororesin pulverized after firing and the unfired fluororesin powder are both polytetrafluoroethylene.

16. The fluororesin dispersion according to claim 15, wherein
    the fluororesin pulverized after firing accounts for about 50 wt % of the total fluororesin dispersion.

17. The fluororesin dispersion according to claim 14, further comprising a dissimilar property component mixed therein, the dissimilar property component having a property different from those of both the fluororesin pulverized after firing and the unfired fluororesin powder.

18. A fired body, comprising:
    the fluororesin dispersion according to claim 14; and
    a contact member, wherein
    the fluororesin dispersion and the contact member have been integrally fired after being brought into contact with each other.

* * * * *